United States Patent
Betti et al.

(10) Patent No.: US 11,716,624 B2
(45) Date of Patent: Aug. 1, 2023

(54) METHOD AND SYSTEM FOR AVOIDING SPURIOUS SIGNALLING IN A COMMUNICATION SYSTEM

(71) Applicant: TELECOM ITALIA S.p.A., Milan (IT)

(72) Inventors: Alessandro Betti, Rome (IT); Francesca Filipponi, Rome (IT); Fabio Mazzoli, Rome (IT); Patricia Scognamiglio, Rome (IT)

(73) Assignee: TELECOM ITALIA S.p.A., Milan (IT)

( * ) Notice: Subject to any disclaimer, the term of this patent is extended or adjusted under 35 U.S.C. 154(b) by 260 days.

(21) Appl. No.: 16/956,478

(22) PCT Filed: Dec. 5, 2018

(86) PCT No.: PCT/EP2018/083638
§ 371 (c)(1),
(2) Date: Jun. 19, 2020

(87) PCT Pub. No.: WO2019/121017
PCT Pub. Date: Jun. 27, 2019

(65) Prior Publication Data
US 2021/0014685 A1 Jan. 14, 2021

(30) Foreign Application Priority Data
Dec. 21, 2017 (IT) .......................... 102017000148068

(51) Int. Cl.
*H04W 12/08* (2021.01)
*H04W 12/72* (2021.01)
(Continued)

(52) U.S. Cl.
CPC ............ *H04W 12/08* (2013.01); *G06F 21/10* (2013.01); *H04L 65/1076* (2013.01);
(Continued)

(58) Field of Classification Search
CPC ............ H04L 65/1073; H04L 65/1016; G06F 2221/0713; H01L 2924/0002
See application file for complete search history.

(56) References Cited

U.S. PATENT DOCUMENTS

2006/0025149 A1* 2/2006 Karaoguz ........... H04W 72/085
455/452.2
2012/0033679 A1* 2/2012 Horn ..................... H04W 48/10
370/401
(Continued)

OTHER PUBLICATIONS

International Search Report and Written Opinion of the International Search Authority dated Jan. 30, 2019 in International Application No. PCT/EP2018/083638.
(Continued)

*Primary Examiner* — Anez C Ebrahim
(74) *Attorney, Agent, or Firm* — Oblon, McClelland, Maier & Neustadt, L.L.P.

(57) ABSTRACT

In a method for managing access by a user device to multimedia services delivered by a communication system, the user device accesses the multimedia services through a Radio Access Technology (RAT). An information element sent to the user device from the communication system includes restriction information that indicates the types of RAT that the user device may use to access the multimedia services. The restriction information also includes the types of RAT that the user device cannot use to access the multimedia services. The information element also includes additional restriction information indicating the multimedia services that can be accessed by the user device, and the multimedia services that cannot be accessed by the user device. The additional restriction information is based on subscription information for the user device.

12 Claims, 4 Drawing Sheets

(51) Int. Cl.
*G06F 21/10* (2013.01)
*H04L 65/1076* (2022.01)
*H04L 65/1016* (2022.01)
*H04L 65/1073* (2022.01)

(52) U.S. Cl.
CPC ..... *H04W 12/72* (2021.01); *G06F 2221/0713* (2013.01); *H04L 65/1016* (2013.01); *H04L 65/1073* (2013.01)

(56) References Cited

U.S. PATENT DOCUMENTS

| | | | |
|---|---|---|---|
| 2012/0046058 A1* | 2/2012 | Vesterinen | H04W 8/082 455/507 |
| 2021/0169191 A1* | 6/2021 | Mannarelli | A45C 3/06 |

OTHER PUBLICATIONS

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15)", 3GPP Standard; Technical Specification; 3GPP TS 29.272, 3rd Generation Partnership Project (3GPP), Mobile Competence Centre; 650, Route Des Lucioles: F-06921 Sophia-Antipolis Ced Ex; France, vol. CT WG4, No. V15.1.0, Sep. 18, 2017 (Sep. 18, 2017), pp. 1-166, XP051336998, [retrieved on Sep. 18, 2017].

Ericsson: "Mapping of ext-AccessRestrictionData in IWF", 3GPP Draft; 29305 CR0063 (REL-15) C4-175115, 3rd Generation Partnership Project (3GPP), Mobile Competence Centre; 650, Route Des Lucioles; F-06921 Sophia-Antipolis Cedex; France, vol. CT WG4, No. Kochi, India; Oct. 23, 2017-Oct. 27, 2017 Dec. 17, 2017 (Dec. 17, 2017), XP051363555, Retrieved from the Internet: URL:http://www.3gpp.org/Meetings 3GPP_SYNC/CT/Docs/29305_CR0063_(Rel-15)_C4-175115.doc [retrieved on Dec. 17, 2017].

Nokia Siemens Networks et al.: "Pseudo-CR on 86d completion", 3GPP Draft; C4-082483, 3rd Generation Partnership Project (3GPP), Mobile Competence Centre; 650, Route Des Lucioles: F-06921 Sophia-Antipolis Cedex ; France, No. Budapest; Aug. 21, 2008, Aug. 21, 2008 (Aug. 21, 2008), XP050314342, [retrieved on Aug. 21, 2008].

* cited by examiner

METHOD AND SYSTEM FOR AVOIDING SPURIOUS SIGNALLING IN A COMMUNICATION SYSTEM

BACKGROUND OF THE INVENTION

Field of the Invention

The present invention generally relates to a communication system (e.g., an "Evolved Packet System") comprising an "IP Multimedia Subsystem" providing IP multimedia services. More particularly, the present invention relates to a system and method for avoiding undesired spurious signalling traffic due to user devices having capabilities of, but being precluded from, accessing IP multimedia services.

Overview of the Related Art

International standardization bodies like 3GPP (www.3gpp.org), GSMA (www.gsma.org) and OMA ("Open Mobile Alliance") specify functional modules and procedures of IP multimedia services including "Voice Over LTE" (VoLTE), "Video Over LTE" (ViLTE) and "Rich Communication Services" (RCS), the latter including one-to-one chat, group chat and file sharing.

VoLTE and ViLTE are respectively defined in GSMA IR.92 and GSMA IR.94 technical specifications: they represent a basic implementation profile of the 3GPP MMTEL ("Multi Media Telephony over IMS") service to support voice and video services on communication systems. RCS is defined in OMA 5.x technical specification.

Considering for example an "Evolved Packet System" (hereinafter, EPS system) as a communication system, the IP multimedia services (such as VoLTE, ViLTE, and RCS) are provided by (i.e. delivered through) an IP Multimedia Subsystem (IMS), hereinafter IMS network. By IMS network it is meant an architectural framework for delivering the IP multimedia services to user devices of the EPS system, where the user devices connect to the IMS network by means of a radio access network (e.g., a LTE radio access network), and the IMS network delivers the IP multimedia services by orchestrating (i.e., arranging or managing or handling) connection of the user devices to PDN network(s), such as IP networks.

SUMMARY OF INVENTION

The Applicant has found that, with the wide spread in the market of user devices capable of accessing IP multimedia services (including, for example, mobile phones, personal digital assistants (PDAs) or computers), uncontrolled and undesired spurious signalling may generate between the IMS network (or, more generally, between the EPS system) and user devices that, despite being capable of accessing the IP multimedia services, are precluded from accessing the IP multimedia services, for a number of reasons.

User devices might be precluded from accessing the IP multimedia services since, for example, the respective users (i.e., the users to which the user devices belong) have no access rights (e.g., due to an absence of valid subscription) to the IP multimedia services. In this case, in fact, according to specific implementations of user device vendors, the user devices may be configured to try to access the IP multimedia services, and to retry to access them (e.g., in case of a change of "Radio Access Technology" or periodically) even upon previous rejections by the IMS network (e.g., due to the absence of active or valid subscriptions). These continuous attempts of accessing the IP multimedia services, and corresponding rejections by the IMS network, generate the above-mentioned uncontrolled and undesired spurious signalling.

The Applicant has understood that this spurious signalling may affect the capacity of a telecommunication operator network in terms of load to be managed (which involves an oversizing of network equipment, and hence high costs of the network infrastructure), as well as the residual data traffic available for the user.

The Applicant is aware of the presence in the art of solutions generally relating to the processing of user device requests for accessing IP multimedia services.

For example, WO 2016/098997 A1 discloses an apparatus for detecting an abnormal VoLTE registration message in a 4G mobile network. The apparatus includes a packet information extraction unit, a session information storage unit, a packet analysis unit, and a packet processing unit which processes the GTP-U packet according to a detection policy when the SIP REGISTER message is the abnormal SIP REGISTER message.

However, the Applicant has recognized that the known solutions, including WO 2016/098997 A1, are not satisfactory, in that none of them teaches how to avoid the uncontrolled and undesired spurious signalling.

The Applicant has faced the above mentioned issues, and has devised a solution for avoiding uncontrolled and undesired spurious signalling between the IMS network (or, more generally, between the EPS system) and user devices that are precluded from accessing the IP multimedia services.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for managing access by a user device to IP multimedia services delivered by a communication system. The user device is capable of accessing the IP multimedia services through at least one Radio Access Technology. The method comprises:

including, in an information element sent by the communication system to the user device for providing to the user device restriction information indicative of allowed types of Radio Access Technology that such user device is allowed to exploit for accessing the IP multimedia services, and of not-allowed types of Radio Access Technology that such user device is not allowed to exploit for accessing the IP multimedia services, additional restriction information indicative of allowed IP multimedia services that can be accessed by the user device and of not-allowed IP multimedia service that cannot be accessed by the user device, said additional restriction information being based on subscription information of a user of the user device, and providing the information element to the user device.

According to an embodiment of the present invention, the method further comprises, at the user device:

receiving said information element, and stopping any requests to access each not-allowed IP multimedia service according to the additional restriction information included in said information element.

According to an embodiment of the present invention, said stopping any requests to access each not-allowed IP multimedia service comprises stopping any requests to access each not-allowed IP multimedia service until the user device is restarted.

According to an embodiment of the present invention, the IP multimedia services are delivered by the communication system by connection of the user device to a Packet Data Network, and the user device is preferably capable of accessing at least one IP data service, different from said IP multimedia services, by connection to said Packet Data Network. Advantageously, the method further comprises, at the user device:

performing no connection to the Packet Data Network if an Access Point Name associated with a requested IP data service of said at least one IP data service is equal to an Access Point Name associated with any of said each not-allowed IP multimedia service.

According to an embodiment of the present invention, said information element comprises the Access-Restriction-Data field of the Subscription-Data AVP defined by 3rd Generation Partnership Project technical specifications.

According to an embodiment of the present invention, the communication system comprises a Mobility Management Entity and a Home Subscriber Server. Advantageously, said including additional restriction information is carried out by the Home Subscriber Server in response to an Update Location Request transmitted from the Mobility Management Entity to the Home Subscriber Server. More advantageously, the method further comprises transmitting an Update Location Answer including said information element from the Home Subscriber Server to the Mobility Management Entity.

According to an embodiment of the present invention, said Update Location Request is transmitted from the Mobility Management Entity to the Home Subscriber Server in response to an Initial Attach request transmitted from the user device to the Mobility Management Entity. Preferably, the method further comprises transmitting from the Mobility Management Entity an Initial Attach response to the user device, the Initial Attach response preferably comprising said information element.

According to an embodiment of the present invention, the communication system comprises a Mobility Management Entity and a Home Subscriber Server. Advantageously, said including additional restriction information is carried out by the Home Subscriber Server in response to a change of the subscription information received at the Home Subscriber Server. More advantageously, the method further comprises, preferably in response to said change of the subscription information received at the Home Subscriber Server, transmitting an Insert Subscriber Data Request including said information element from the Home Subscriber Server to the Mobility Management Entity.

According to an embodiment of the present invention, the IP multimedia services comprise at least one among Voice over LTE, Video over LTE and Rich Communication Services.

Another aspect of the present invention relates to communication system, such as an Evolved Packet System, for delivering IP multimedia services to a user device capable of accessing the IP multimedia services through at least one Radio Access Technology. The communication system comprises:

a Home Subscriber Server module for generating an information element including first restriction information indicative of allowed types of Radio Access Technology that such user device is allowed to exploit for accessing the IP multimedia services, and of not-allowed types of Radio Access Technology that such user device is not allowed to exploit for accessing the IP multimedia services, and second restriction information indicative of allowed IP multimedia services that can be accessed by the user device and of not-allowed IP multimedia services that cannot be accessed by the user device, said second restriction information being preferably based on subscription information of a user of the user device, and a Mobility Management Entity module for sending to the user device a message including the information element.

According to an embodiment of the present invention, the message including the information element is an Update Location Answer or an Initial Attach response defined by 3rd Generation Partnership Project technical specifications.

A further aspect of the present invention relates to a user device capable of accessing IP multimedia services delivered by a communication system. The user device comprises:

a request generation module for generating an access request for accessing the IP multimedia services;

a transmitter module for transmitting the access request to the communication system;

a receiver module for receiving an information element, wherein said information element comprises first restriction information indicative of allowed types of Radio Access Technology that such user device is allowed to exploit for accessing the IP multimedia services, and of not-allowed types of Radio Access Technology that such user device is not allowed to exploit for accessing the IP multimedia services, and second restriction information indicative of allowed IP multimedia services that can be accessed by the user device and of not-allowed IP multimedia services that cannot be accessed by the user device, and a control module for controlling said request generation to stop any access requests to access each not-allowed IP multimedia service according to the second restriction information included in said information element.

BRIEF DESCRIPTION OF THE ANNEXED DRAWINGS

These and other features and advantages of the present invention will be made apparent by the following description of some exemplary and non-limitative embodiments thereof; for its better intelligibility, the following description should be read making reference to the attached drawings, wherein.

DETAILED DESCRIPTION OF PREFERRED EMBODIMENTS OF THE INVENTION

Figure 1:
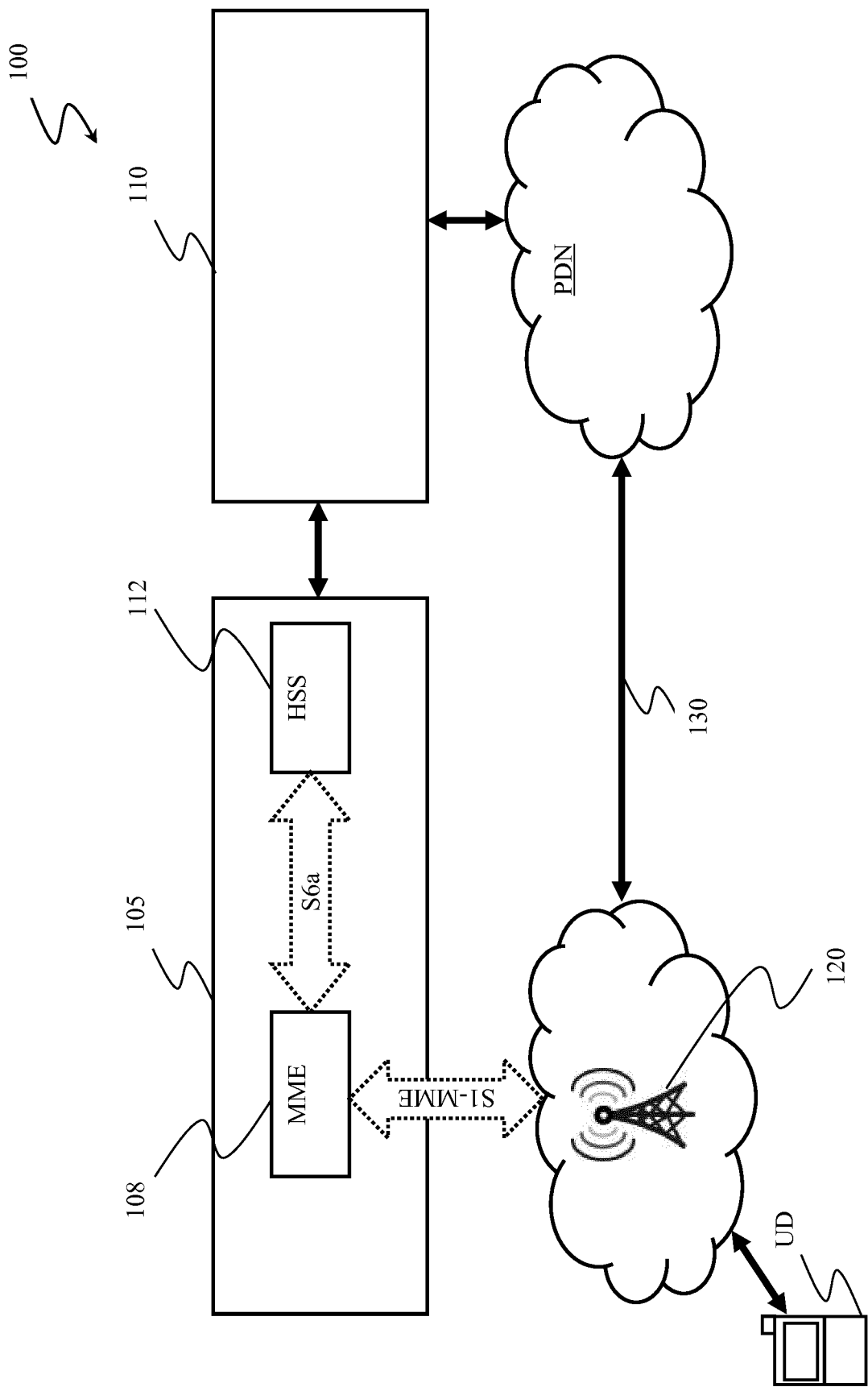
FIG. 1 shows a basic architecture of an Evolved Packet System according to an embodiment of the present invention.

FIG. 1 shows a basic architecture of a communication system, for example an Evolved Packet System (hereinafter, EPS system) 100, according to an embodiment of the present invention. In the following, only components of the EPS system 100 that are relevant for the understanding of the present invention will be shown and discussed.

The communication system comprises a core network. In the example at issue of EPS system 100 as communication system, the core network is an IP-based core network, such as the core network of the LTE system (or Evolved Packet Core, described in the 3GPP Technical Specification TS 23.002), and will be referred to as EPC network 105 in the following.

The EPS system 100 also comprises one or more external IP networks to which the EPC network 105 is connected. For the purposes of the present invention, the external IP network(s) comprise(s) one or more "Packet Data Networks" (or PDN networks), such as the PDN network PDN. The EPC network 105 is connected to the PDN network PDN through an IP Multimedia Subsystem (IMS), hereinafter IMS network 110. By IMS network 110 it is meant an architectural framework for delivering IP multimedia services (hereinafter, IMS services) to user devices UD connecting to the EPS system 100 (the IMS services being delivered by the IMS network 110 by orchestrating (i.e., arranging or managing or handling) connection of the user devices UD to the PDN network PDN). Examples of IMS services are "Voice over LTE" (VoLTE), "Video over LTE" (ViLTE) and "Rich Communication Services" (RCS).

For the purposes of the present disclosure, a user device UD is an electronic device, external to the EPS system 100, capable of accessing IMS services (also referred to as IMS device, and including for example a mobile phone, a smartphone, a tablet, a personal digital assistant (PDA) or a computer) by connection to the EPS system 100 (and, particularly, to the IMS network 110). In the following, when necessary, users to whom the user device UD belong will be also distinguished between IMS users, i.e. users having access rights (e.g., due to an existing or valid subscription) to IMS services through their IMS devices, and non-IMS users, i.e. users having no access rights (e.g., due to an absence or non-valid subscription) to the IMS services regardless of whether their user devices UD are IMS devices or not.

Preferably, the user device UD is capable of accessing the IMS services through a Radio Access Technology (hereinafter, RAT technology), or more thereof. Examples of RAT technologies are Bluetooth, Wi-Fi, 3G and 4G or LTE. In the preferred embodiment herein considered of EPS system as communication system, the user device UD is connected to the EPC network 105 over E-UTRAN (LTE radio access network), e.g. by means of a base station (or more thereof). In the considered example of LTE radio access network, the base station comprises an Evolved NodeB (eNodeB) 120. For the purposes of the present disclosure, the user device UD is also capable of accessing one or more IP data services, different from the IMS services (and including, for example, internet services such as internet browsing), by connection of the user device UD to the PDN network PDN through the eNodeB 120, as shown by arrow 130 (in other words, the user device UD is capable of connecting to the PDN network PDN for accessing the IMS services delivered by the IMS network 110 and/or the IP data services).

For the purposes of the present disclosure, the EPS system 100 preferably comprises the following modules—the term "module" being herein intended to emphasize functional (rather than implementation) aspects thereof. Indeed, without losing generality, each module may be implemented by software, hardware, and/or a combination thereof. Moreover, the modules may also reflect, at least conceptually, the physical structure of the EPS system 100:

"Home Subscriber Server" (HSS) module 112. Basically, the HSS module 112 comprises a database that contains user-related and subscription-related information (subscriber profiles) of IMS users and performs authentication and authorization of the IMS users on the IMS network 110. It also provides information about IMS user location. Preferably, the HSS module 112 supports S6a interface (i.e. the interface based on Diameter protocol and defined, for example, in 3GPP Technical Specification 29.272, between the HSS module 112 and the MME module discussed here below). The HSS module 112 (at least with regard to functionalities thereof that are relevant for the understanding of the present invention and that will be discussed in the following) is part of the EPC network 105;

"Mobility Management Entity" (MME) module 108. The MME module 108 is part of the EPC network 105 and is the key control-node for the LTE access network. It is responsible for idle mode user device UD paging and tagging procedure including retransmissions. It is involved in bearer activation/deactivation processes and is also responsible for choosing the serving gateway for a user device UD at the initial attach and at time of intra-LTE handover involving Core Network (CN) node relocation—the serving gateway, not shown, being the point of interconnect between the radio-side (i.e., the LTE radio access network in the considered example) and the EPC network 105, and serving the user device UD by routing the incoming and outgoing IP data packets. It is responsible for authenticating the users (by interacting with the HSS module 112), and specifically for requesting (e.g., through S6a interface) to the HSS module 112 authentication and profile of users and to update location information of the user devices UD. Preferably, the MME module 108 supports both the above-mentioned interface S6a interface (i.e., the interface between the MME module 108 and the HSS module 112, as described in 3GPP Technical Specification 29.272) and S1-MME interface (i.e., the interface between the MME module 108 and the eNodeB 120, based on Non-Access Stratum (NAS) protocols defined in 3GPP Technical Specification 24.301).

For the sake of completeness, the EPS system 100 also comprises, although not shown, a conventional "Packet Data Network Gateway" module, part of the EPC network 105 (as described in the 3GPP Technical Specification 23.002) configured to route IP data packets to and from the PDN network(s) PDN, a conventional "Proxy-Call Session Control Function" module, part of the IMS network 110 (as described in 3GPP TS 29.228 and in 3GPP TS 29.214) acting as a proxy server for the user device UD, and a conventional "Interrogating/Serving Call State Control Function" module, part of the IMS network 110 (as described in 3GPP TS 23.228 and in 3GPP Technical Specification 24.229).

According to the principles of the present invention, the EPS system 100 is configured to manage access by the user device UD to the IMS services (delivered by the EPS system 100, and particularly by the IMS network 110) by providing (e.g., generating), preferably in the HSS module 112 (as detailed below), an information element including restriction information (hereinafter, IMS restriction information) indicative of allowed IMS services that can be accessed by the user device UD and of not-allowed IMS services that cannot be accessed by the user device UD, wherein the allowed and not-allowed IMS services are based on subscription information of the user to whom the user device UD belongs (i.e., the allowed and not-allowed IMS services are based on whether the user device UD belongs to a IMS user or a non-IMS user, respectively).

Preferably, the information element also comprises, associated with the user device UD, restriction information (hereinafter, RAT restriction information) indicative of allowed RAT technologies (or type of RAT technology) that the user device UD is allowed to exploit for accessing the IMS and/or IP data services and of not-allowed RAT technologies that the user device UD is not allowed to exploit for accessing the IMS and/or IP data services (a RAT technology, or type of RAT technology, may be allowed or not allowed for a user device UD depending on a subscription profile of the respective user and/or on whether the user device UD supports such a RAT technology). In other words, the EPS system 100 is configured to manage access by the user device UD to the IMS services by including, in the information element sent by the EPS system 100 to the user device UD for providing to the user device UD the RAT restriction information, additional restriction information (i.e., the IMS restriction information) indicative of allowed and not-allowed IMS services, and providing the information element to the user device UD.

According to the exemplary considered embodiment, the information element comprises the Access-Restriction-Data field of the information element named Subscription-Data AVP ("Attribute-Value Pair") defined by 3GPP Technical Specifications. Preferably, the Access-Restriction-Data AVP is enriched (hereinafter, enriched Access-Restriction-Data AVP) with respect to the conventional Access-Restriction-Data AVP described, for example, in 3GPP Technical Specification 29.272, Table 7.3.31/1. More particularly, the enriched Access-Restriction-Data AVP comprises both the RAT restriction information (as in the conventional Access-Restriction-Data AVP) and the IMS restriction information. In other words, in the considered embodiment, the enriched Access-Restriction-Data AVP also comprises, in addition to the information related to allowed and not-allowed RAT technologies, the information (which is an additional information with respect to the conventional Access-Restriction-Data AVP) related to the allowed and not-allowed IMS services (preferably, the information related to each allowed and not-allowed IMS service).

An example of enriched Access-Restriction-Data AVP is the following (wherein the bold font strings "VoLTE allowed", "ViLTE allowed" and "RCS allowed" associated with bits 7, 8, and 9, respectively, denote the enrichment with respect to the conventional Access-Restriction-Data AVP):

| Bit | Description |
|---|---|
| 0 | UTRAN Allowed |
| 1 | GERAN Allowed |
| 2 | GAN Allowed |
| 3 | I-HSPA-Evolution Allowed |
| 4 | WB-E-UTRAN Allowed |
| 5 | HO-To-Non-3GPP-Access Allowed |
| 6 | NB-IoT Allowed |
| 7 | VoLTE not allowed |
| 8 | ViLTE not allowed |
| 9 | RCS not allowed |

In this example, the enriched Access-Restriction-Data AVP has the same structure as the conventional Access-Restriction-Data AVP, it meaning that the IMS restriction information is added to the conventional Access-Restriction-Data AVP consistently with the 3GPP Technical Specification 29.272. Therefore, consistently with the 3GPP Technical Specification 29.272, the (additional) bits 7, 8 and 9 identify the corresponding IMS services (in the example at issue, Volte, ViLTE and RCS, respectively) and their values (e.g., 0 or 1) denote the absence or presence, respectively, of a restriction associated with the corresponding IMS services (for example, IMS service allowed or not-allowed, respectively). In the example at issue the bits 7, 8 and 9 are assumed to take values 1, therefore they indicate "VoLTE not allowed", "ViLTE not allowed" and "RCS not allowed", respectively.

According to embodiments of the present invention, upon reception of the information element (e.g., of the enriched Access-Restriction-Data AVP), the user device UD is configured to stop any requests to access each not-allowed IMS service.

The user device UD may advantageously be configured to stop any requests to access each not-allowed IMS service for a predefined time period (e.g., set by a telecommunication operator). Additionally or alternatively, the user device UD may advantageously be configured to stop any requests to access each not-allowed IMS service until the user device UD is restarted (i.e., until the user device UD is switched off and re-switched on).

According to a particularly preferred embodiment of the present invention, upon reception of the information element (e.g., of the enriched Access-Restriction-Data AVP), the user device UD is configured to perform no access to a requested IP data service if an Access Point Name associated with the requested IP data service corresponds (e.g. it is equal to) an Access Point Name associated with any of each not-allowed IMS service. In the example at issue wherein all the considered IMS services (VoLTE, ViLTE, RCS) are all not allowed, according to this particularly preferred embodiment of the present invention the user device UD is configured to perform no access to the requested IP data service if the IMS services are managed by the telecommunication on the same Access Point Name associated with the requested IP data service.

As will be better discussed in the following discussion of exemplary embodiments of the present invention, the information element (e.g., the enriched Access-Restriction-Data AVP) may be generated by the HSS module 112 in response to an Update Location Request transmitted from the MME module 108 to the HSS module 112 (the Update Location Request being preferably generated and transmitted in response to an Initial Attach request from the user device UD to the MME module 108), and may be included in an Update Location Answer transmitted from the HSS module 112 to the MME module 108 (in its turn, the Update Location Answer preferably generating an Initial Attach response comprising the information element from the MME module 108 to the user device UD); additionally or alternatively, the information element (e.g., the enriched Access-Restriction-Data AVP) may be generated by the HSS module 112 in response to a change of the subscription information (or subscription profile) received at the HSS module 112 (the change of the subscription information being for example sent or notified by a control logic unit, not shown, of the telecommunication operator), and may be included in an Insert Subscriber Data Request transmitted from the HSS module 112 to the MME module 108.

Figure 2:
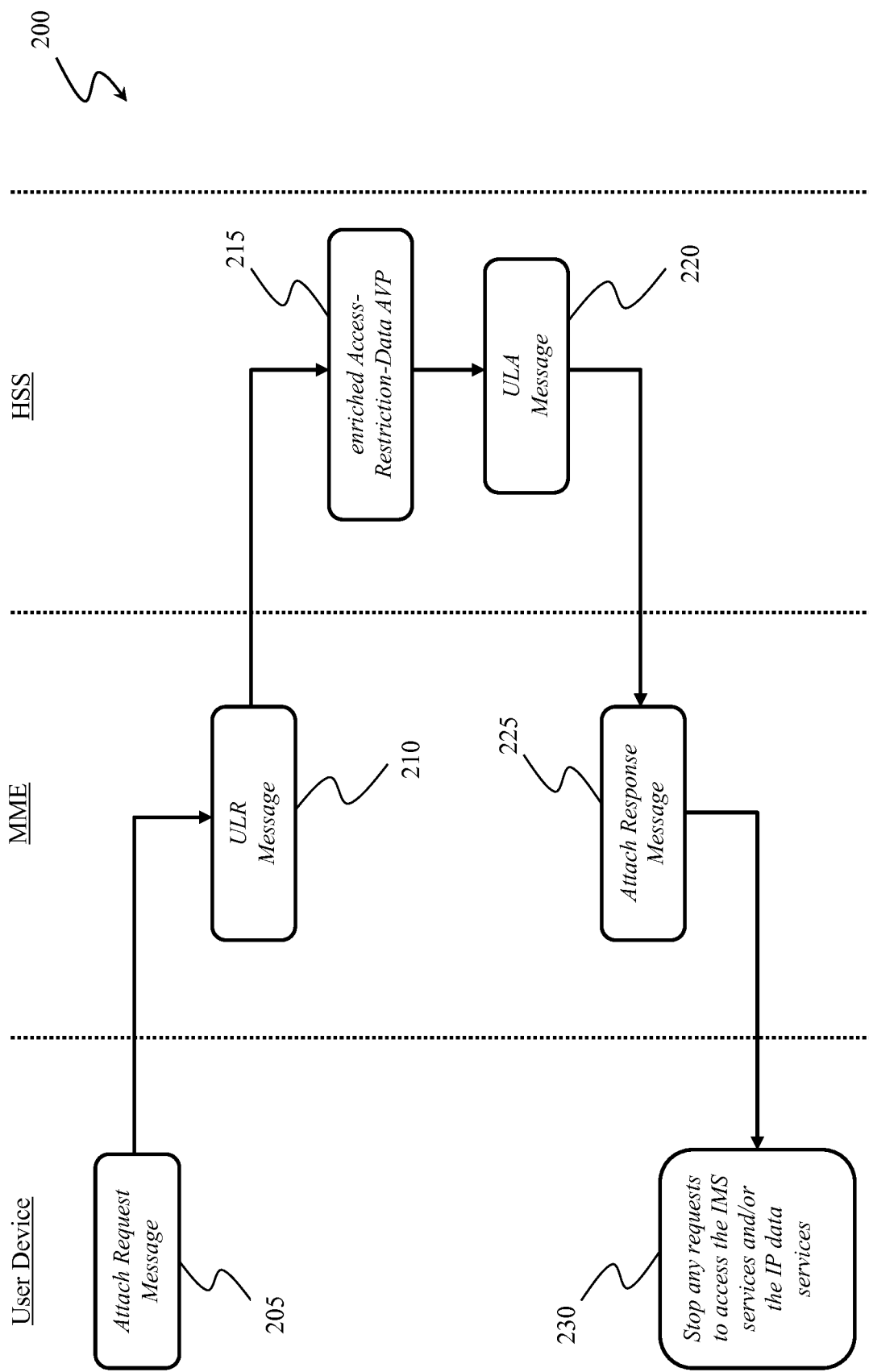
FIG. 2 shows a swim-lane activity diagram of a method for processing an Initial Attach request and an Initial Attach response from and to, respectively, a user device connecting to the Evolved Packet System of FIG. 1, according an embodiment of the present invention.

With reference now to FIG. 2, it shows a swim-lane activity diagram of a method (hereinafter, IA ("Initial Attach") processing method) 200, implemented by the EPS system 100, for processing the Initial Attach request and the Initial Attach response, according an embodiment of the present invention. For example, the Initial Attach is a process making part of the initial stages of connection to an IMS service, for example of the setting up a VoLTE call.

Figure 3:
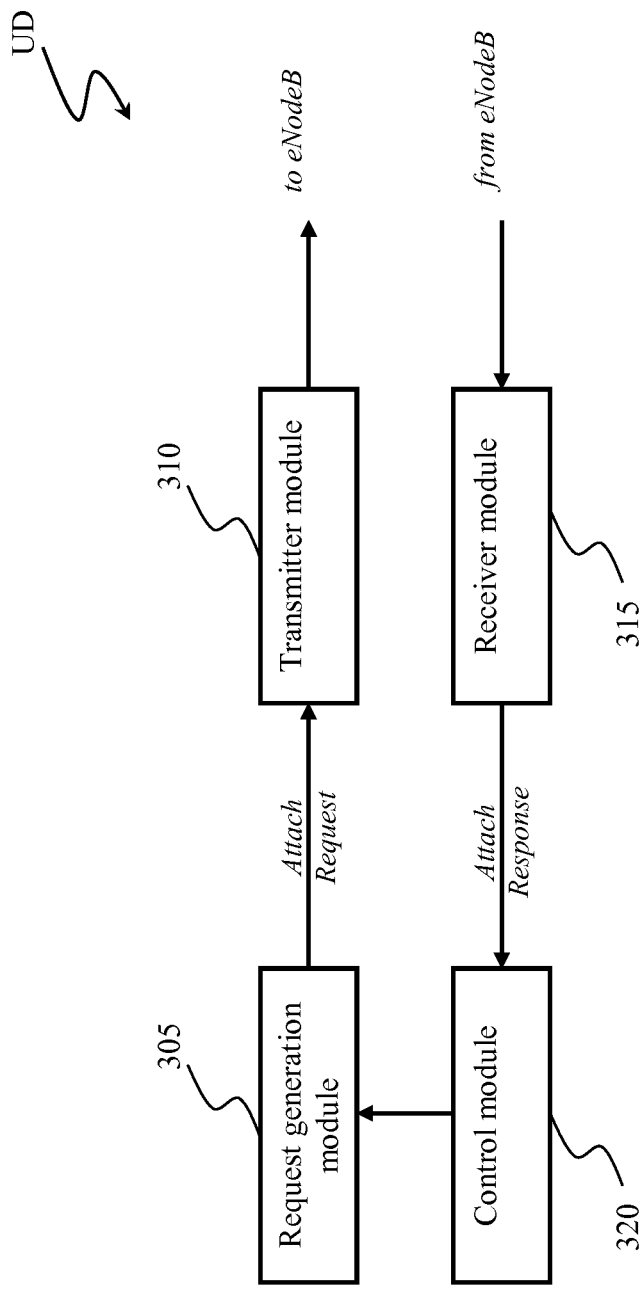
FIG. 3 shows main user device modules involved in the method of FIG. 2, according to an embodiment of the present invention.

For the purposes of the present disclosure, the entities involved in the IA processing method 200 are those represented in FIG. 1, namely the user device UD, the e-NodeB 120, the MME module 108 and the HSS module 112; however, for the sake of conciseness, the e-NodeB 120 has been omitted in the swim-lane activity diagram shown in FIG. 2 in that, only for the purposes of understanding of the present invention, it acts as mere intermediary between the user device UD and the MME module 108 (i.e., only for the purposes of understanding of the present invention, it does not affect the Initial Attach request and the Initial Attach response). For ease of description FIG. 2 will be discussed jointly with FIG. 3, which shows main modules of the user device UD involved in the IA processing method 200, according to an embodiment of the present invention.

The IA processing method 200 according to an embodiment of the present invention starts at the action block 205, where the user device UD attempts to initially attach to the EPS system 100 by sending an attach request (e.g., an Attach Request message embedded in the NAS-PDU field of the Initial UE Message) to the MME module 108 (specifically, to a NAS layer thereof); in order to achieve that, the user device UD preferably comprises a request generation module 305 for generating the attach request, and a transmitter module 310 (e.g., a LTE module) for transmitting it to the eNodeB 120. For the purposes of the present disclosure, the request generation module 305 is also configured to generate requests for accessing the IMS services (for example, Session Initiation Protocol requests) and, preferably, the IP data services as well, which requests depend on specific implementations of user device vendors—for example, the user devices may be configured to try to access the IMS services, and to retry to access them (e.g., in case of a change of RAT technology or periodically) even upon previous rejections by the IMS network 110 (e.g., due to the absence of active or valid subscriptions).

Then, action block 210, the MME module 108 sends an Update Location Request message (hereinafter, ULR message) to the HSS module 112, the ULR message being in accordance with the Diameter protocol (transmission between the MME module 108 and the HSS module 112 over the S6a interface), in order to notify of the registration of the user device UD and obtain the subscription information of the user device UD (i.e., of the user to whom the user device UD belongs) having sent the attach request.

The IA processing method 200 goes on to action block 215, where the enriched Access-Restriction-Data AVP (discussed above) comprising, for the user device UD, both the RAT restriction information (as in the conventional Access-Restriction-Data AVP) and the IMS restriction information is generated (if not yet available) or obtained or retrieved (if already available) and included (action block 220) in an Update Location Answer message (hereinafter, ULA message). The ULA message comprises Subscription-Data with user profile information associated to the user device UD (e.g., maximum bit rate, quality of service, roaming enabled/barring, access type allowed/barring), as well as the enriched Access-Restriction-Data AVP.

Therefore, according to the present invention, the ULA message generated by the HSS module 112 is different from the conventional ULA message as described, for example, in 3GPP Technical Specification 29.272 (Table 5.2.1.1.1/2); preferably, the ULA message generated by the HSS module 112 is enriched (i.e., it includes additional information) with respect to the conventional ULA message (in the following, the ULA message generated by the HSS module 112 will be referred to as enriched ULA message, for distinguishing it from the conventional ULA message), and particularly the enriched ULA message comprises the enriched Access-Restriction-Data AVP.

In the exemplary considered embodiment, the MME module 108 is assumed to be capable of managing (i.e., recognizing or reading) the additional bits associated with the IMS restriction information. In any case, embodiments of the present inventions, not shown, may provide for dedicated units or sub-units (such as dedicated sub-units, for example embedded in a conventional MME module or external thereto) specifically configured for managing the additional bits associated with the IMS restriction information.

Back to the IA processing method 200, the enriched ULA message (containing the enriched Access-Restriction-Data AVP) is transmitted from the HSS module 112 to the MME module 108.

Then, action block 225, the MME module 108 sends an attach response (e.g., an Attach Response message) to the user device UD. For the purposes of the present invention, the Attach Response message comprises both the RAT restriction information and the IMS restriction information, in accordance with NAS protocol (transmission between the MME module 108 and the user device UD through the eNodeB 120, over the S1-MME interface).

At user device UD side, upon reception (at a receiver module 315 thereof) of the Attach Response message and recognition (by means of a control module 320 thereof) of the presence of the IMS restriction information, the user device UD is configured to stop (action block 230) any requests for accessing the not-allowed IMS services (e.g., as discussed above, for a predefined time period set by the telecommunication operator and/or until the user device UD is restarted). Preferably, this is achieved by means of the control module 320 of the user device UD, which control module 320, after having recognized the presence of the IMS restriction information in the enriched ULA message, is configured to control the request generation module 305 in such a way to stop the generation of any requests for accessing the IMS services.

Particularly, based on the RAT and IMS restriction information, the user device UD can complete the attach procedure on E-UTRAN (if, according to the RAT restriction information, E-UTRAN is an allowed (type of) RAT technology) while blocking any attempt to register to the not-allowed IMS services (as indicated in the IMS restriction information).

As mentioned above, at action block 230, the user device UD is also configured to perform no access to a requested IP data service if the Access Point Name associated with the requested IP data service corresponds (e.g. it is equal to) the Access Point Name associated with any of each not-allowed IMS service. Considering, just as an example, not-allowed IMS services as well as internet services as the requested IP data service, if the IMS services are managed by the telecommunication operator on a specific or dedicated Access Point Name (e.g., IMS network as IR.92), then, according to the considered embodiment of the present invention, the user device UD does not establish a connection to the PDN network PDN at all, whereas if the IMS services are managed by the telecommunication operator on the same Access Point Name used for Internet services, the user device UD is allowed to establish a connection to the PDN network PDN for Internet services but, in the meantime, it is configured to block any further attempt to register itself to the IMS services delivered by exploiting the PDN network PDN.

Figure 4:
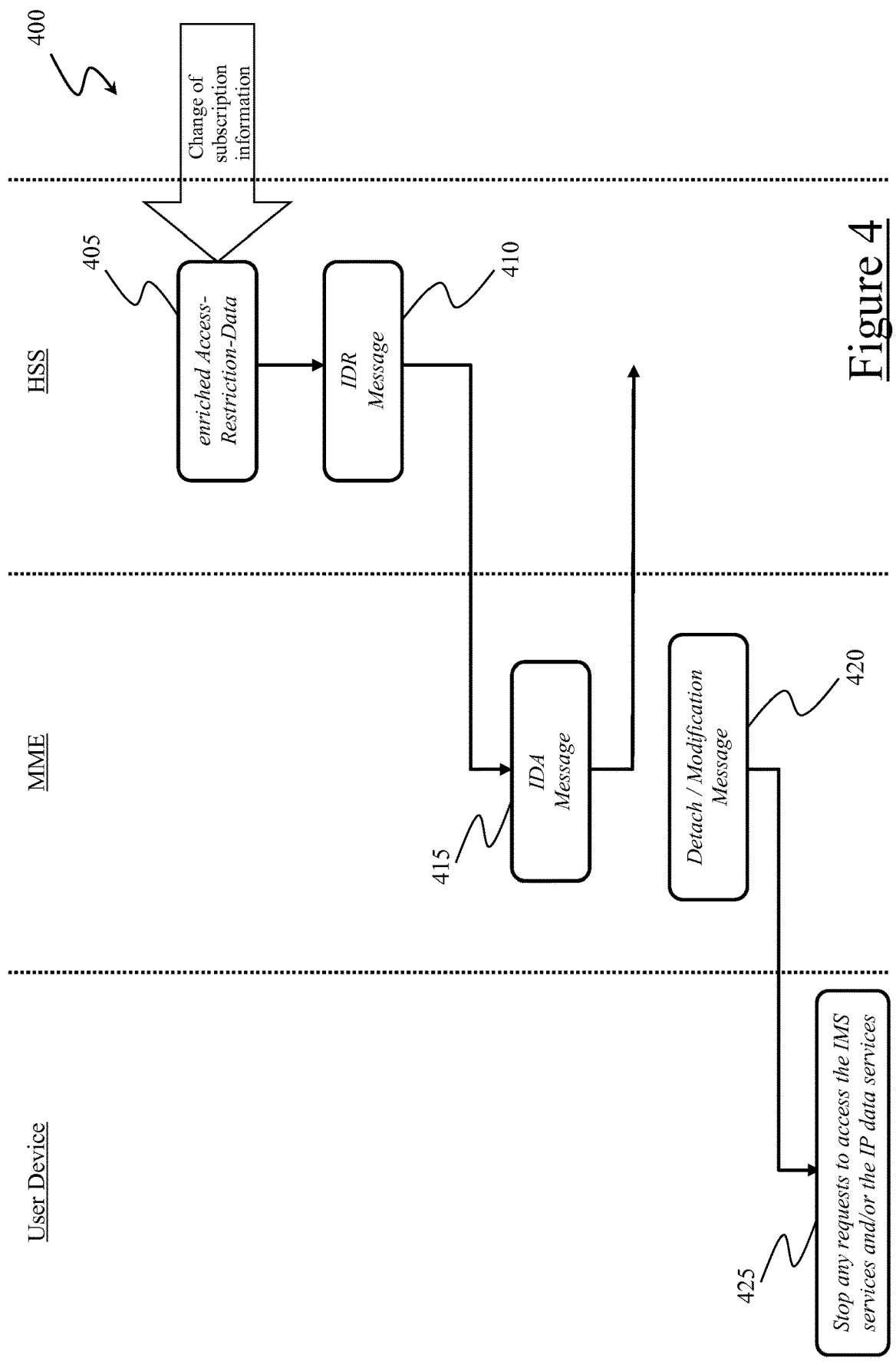
FIG. 4 shows a swim-lane activity diagram of a method for managing a change in service subscription of a user connecting to the Evolved Packet System of FIG. 1, according an embodiment of the present invention.

With reference now to FIG. 4, it shows a swim-lane activity diagram of a method (hereinafter, ISD ("Insert Subscriber Data") processing method) 400, implemented by the EPS system 100, for processing an Insert Subscriber Data Request and an Insert Subscriber Data Response, according an embodiment of the present invention. Similarly to FIG. 2, the entities involved in the ISD processing method 400 are those represented in FIG. 1, namely the user device UD, the e-NodeB 120, the MME module 108 and the HSS module 112; however, for the sake of conciseness, the e-NodeB 120 has been omitted in the swim-lane activity diagram shown in FIG. 2 in that, only for the purposes of understanding of the present invention, it acts as mere intermediary between the user device UD and the MME module 108. As should be readily understood, the main modules of the user device UD involved in the IA processing method 200 are intended to be involved in a similar way also in the ISD processing method 400.

The ISD processing method 400 according to an embodiment of the present invention starts at the action block 405, where the HSS module 112, in response to a change of the subscription information received by a control logic unit (not shown) of the telecommunication operator, changes the subscription information of the user device UD accordingly. According to an embodiment of the present invention, the HSS module 112 generates the enriched Access-Restriction-Data AVP (discussed above) comprising, for the user device UD, both the RAT restriction information (as in the conventional Access-Restriction-Data AVP) and the IMS restriction information.

Then, action block 410, the HSS module 112 generates an Insert Subscriber Data Request (hereinafter, IDR message). The IDR message comprises Subscription-Data with user profile information associated to the user device UD (e.g., maximum bit rate, quality of service, roaming enabled/barring, access type allowed/barring), as well as the enriched Access-Restriction-Data AVP (discussed above) comprising both the RAT restriction information (as in the conventional Access-Restriction-Data AVP) and the IMS restriction information as indicated in the change of the subscription information received by the control logic unit of the telecommunication operator (however, it should be noted that, although not relevant for the present invention, the change of the subscription information may also or exclusively affect the (type of) RAT technology that the user device UD is allowed to exploit).

Therefore, according to the present invention, the IDR message generated by the HSS module 112 is different from the conventional IDR message as described, for example, in 3GPP Technical Specification 29.272 (Table 5.2.2.1.1/1); preferably, the IDR message generated by the HSS module 112 is enriched (i.e., it includes additional information) with respect to the conventional IDR message (in the following, the IDR message generated by the HSS module 112 will be referred to as enriched IDR message, for distinguishing it from the conventional IDR message), and particularly the enriched IDR message comprises the enriched Access-Restriction-Data AVP discussed above.

Back to the ISD processing method 400, the enriched IDR message (containing the enriched Access-Restriction-Data AVP) is transmitted from the HSS module 112 to the MME module 108. In turn, the MME module 108 sends (action block 415) an Insert Subscriber Data Answer (hereinafter, IDA message) to the HSS module 112, as described, for example, in 3GPP Technical Specification 29.272 (Table 5.2.2.1.1/2), the IDA message substantially acting, in the context of the Insert Subscriber Data procedure, as an acknowledgement of receipt of the enriched IDR message by the MME module 108.

Then, based on the IMS restriction information (or, according to the exemplary considered embodiment of the present invention, based on both RAT and IMS restriction information), the user device UD is preferably configured to stop any requests to access each not-allowed IMS service (action block 425)—for example, as discussed above, for a predefined time period set by a telecommunication operator, and/or until the user device UD is restarted—and more preferably the user device UD is configured to perform no access to a requested IP data service if the Access Point Name associated with the requested IP data service corresponds (e.g. it is equal) to the Access Point Name associated with any of each not-allowed IMS service.

In order to achieve that, according to the considered embodiment of the present invention, the MME module 108 may be configured to send (action block 420) to the user device UD either a Detach Request message (i.e. a conventional message in response to which the user device UD does not perform or interrupts connection to the PDN network PDN) or a Modification message (i.e., a conventional message in response to which the user device UD changes the RAT technology exploited for accessing the PDN network PDN).

According to the present invention, the Detach Request message is also affected by the IMS restriction information (other than by the RAT restriction information). Just as an example, the Detach Request message may be sent by the MME module 108 in response to the following scenarios:

the RAT restriction information indicates that all RAT technologies are not-allowed RAT technologies. Therefore, in this case, the access to the IMS services (and, more generally, to the PDN network) is prevented due to restrictions on RAT technologies, regardless of the IMS services are allowed or not-allowed IMS services (this is similar to the standard scenario, as the presence of the IMS restriction information is in this case not relevant);

the IMS restriction information indicates that the requested IMS service is a not-allowed IMS service and the Access Point Name associated with the requested IMS service is the same as the Access Point Name associated with the requested IP data service. Therefore, in this case, the access to the PDN network (and therefore to the allowed RAT technologies) is prevented due to restrictions on IMS services and to their Access Point Name configurations.

Similarly, according to the present invention, the Modification message is also affected (with respect to the standard Modification message) by the access of the user device UD to the IMS services. Just as an example, the Modification message may be sent by the MME module 108 in response to the following scenarios:

the RAT restriction information indicates a change in the allowed RAT technologies. Therefore, in this case, the access to the allowed IMS services is carried out based on the (new or updated) allowed RAT technologies;

the IMS restriction information indicates that the requested IMS service is an allowed IMS service, however the RAT technology or technologies currently exploited by the user device UD are not compatible with the requested IMS service. In this case, if, according to the RAT restriction information, there is at least one allowed RAT technology that is compatible with the requested IMS service, the user device UD is allowed to connect to the PDN network by exploiting the compatible allowed RAT technology;

the IMS restriction information indicates that the requested IMS service has switched from being a not-allowed IMS service to an allowed IMS service, in which case the user device UD is allowed to access the requested IMS service over a (compatible) allowed RAT technology.

The proposed IA and ISD processing methods allow managing access to the IMS services by a user device. More particularly, the proposed IA and ISD processing methods avoid spurious signalling typically caused by uncontrolled requests of accessing IMS services from user devices that are precluded from accessing the IMS services.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the Evolved Packet System has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although in the foregoing explicit reference has been made to an EPS system, the present invention may equivalently apply to any communication system provided with a Radio Access Technology and a core network.

The invention claimed is:

1. A method for managing access by a user device to IP multimedia services delivered by a communication system, wherein the user device is capable of accessing the IP multimedia services through at least one Radio Access Technology, the method comprising:

including, in an information element sent by the communication system to the user device for providing to the user device restriction information indicative of allowed types of Radio Access Technology that the user device is allowed to exploit for accessing the IP multimedia services, and of not-allowed types of Radio Access Technology that such user device is not allowed to exploit for accessing the IP multimedia services, additional restriction information indicative of allowed IP multimedia services that can be accessed by the user device and of not-allowed IP multimedia services that cannot be accessed by the user device, said additional restriction information being based on subscription information of a user of the user device; and providing the information element to the user device, wherein the information element is an Access-Restriction-Data field of a Subscription-Data of an Attribute-Value Pair (AVP), and the additional restriction information is indicated as bits appended to the Access-Restriction Data field.

2. The method according to claim 1, further comprising, at the user device:

receiving said information element; and stopping any requests to access each not-allowed IP multimedia service according to the additional restriction information included in said information element.

3. The method according to claim 2, wherein said stopping any requests to access each not-allowed IP multimedia service comprises stopping any requests to access each not-allowed IP multimedia service until the user device is restarted.

4. The method according to claim 2, wherein the IP multimedia services are delivered by the communication system by connection of the user device to a Packet Data Network, and wherein the user device is configured to access at least one IP data service, different from said IP multimedia services, by connection to said Packet Data Network, the method further comprising, at the user device:

performing no connection to the Packet Data Network if an Access Point Name associated with a requested IP data service of said at least one IP data service is equal to an Access Point Name associated with any of said each not-allowed IP multimedia service.

5. The method according to claim 1, wherein the Access-Restriction-Data field of the Subscription-Data AVP is defined by $3^{rd}$ Generation Partnership Project technical specifications.

6. The method according to claim 1, wherein the communication system comprises a Mobility Management Entity and a Home Subscriber Server, wherein said including additional restriction information is carried out by the Home Subscriber Server in response to an Update Location Request transmitted from the Mobility Management Entity to the Home Subscriber Server, and wherein the method further comprises transmitting an Update Location Answer including said information element from the Home Subscriber Server to the Mobility Management Entity.

7. The method according to claim 6, wherein said Update Location Request is transmitted from the Mobility Management Entity to the Home Subscriber Server in response to an Initial Attach request transmitted from the user device to the Mobility Management Entity, the method further comprising transmitting from the Mobility Management Entity an Initial Attach response to the user device, wherein the Initial Attach response comprises said information element.

8. The method according to claim 1, wherein the communication system comprises a Mobility Management Entity and a Home Subscriber Server, wherein said including additional restriction information is carried out by the Home Subscriber Server in response to a change of the subscription information received at the Home Subscriber Server, and wherein the method further comprises, in response to said change of the subscription information received at the Home Subscriber Server, transmitting an Insert Subscriber Data Request including said information element from the Home Subscriber Server to the Mobility Management Entity.

9. The method according to claim 1, wherein the IP multimedia services comprise at least one among Voice over LTE, Video over LTE and Rich Communication Services.

10. A communication system for delivering IP multimedia services to a user device configured to access the IP multimedia services though at least one Radio Access Technology, the communication system comprising:
  a Home Subscriber Server configured to generate an information element including first restriction information indicative of allowed types of Radio Access Technology that the user device is allowed to exploit for accessing the IP multimedia services, and of not-allowed types of Radio Access Technology that the user device is not allowed to exploit for accessing the IP multimedia services, and second restriction information indicative of allowed IP multimedia services that can be accessed by the user device and of not-allowed IP multimedia services that cannot be accessed by the user device, said second restriction information being based on subscription information of a user of the user device, and
  a Mobility Management Entity configured to send to the user device a message including the information element,
  wherein the information element is an Access-Restriction-Data field of a Subscription-Data of an Attribute-Value Pair (AVP), and the additional restriction information is indicated as bits appended to the Access-Restriction Data field.

11. The communication system according to claim 10, wherein the message including the information element is an Update Location Answer or an Initial Attach response defined by 3rd Generation Partnership Project technical specifications.

12. A user device configured to access IP multimedia services delivered by a communication system, the user device comprising:
  hardware configured to
    generate an access request for accessing the IP multimedia services;
    transmit the access request to the communication system;
    receive an information element, wherein said information element comprises first restriction information indicative of allowed types of Radio Access Technology that the user device is allowed to exploit for accessing the IP multimedia services, and of not-allowed types of Radio Access Technology that the user device is not allowed to exploit for accessing the IP multimedia services, and second restriction information indicative of allowed IP multimedia services that can be accessed by the user device and of not-allowed IP multimedia services that cannot be accessed by the user device, said second restriction information being based on subscription information of a user of the user device; and
    control request generation to stop any access requests to access each not-allowed IP multimedia service according to the second restriction information included in said information element,
  wherein the information element is an Access-Restriction-Data field of a Subscription-Data of an Attribute-Value Pair (AVP), and the additional restriction information is indicated as bits appended to the Access-Restriction Data field.

* * * * *